United States Patent [19]

Barré et al.

[11] 4,317,533
[45] Mar. 2, 1982

[54] RETAINING AND LOCKING ARRANGEMENT FOR SPARE TIRE CRADLE

[75] Inventors: Michel Barré, Chaville; Jean P. Carrion, Courbevoie, both of France

[73] Assignee: Regie Nationale des Usines Renault, Boulogne-Billancourt, France

[21] Appl. No.: 7,781

[22] Filed: Jan. 30, 1979

[30] Foreign Application Priority Data

Jan. 30, 1978 [FR] France ............................... 78 02471

[51] Int. Cl.³ .............................................. B62D 43/04
[52] U.S. Cl. .............................. 224/42.21; 224/42.23; 292/216
[58] Field of Search .............. 224/42.06, 42.21, 42.22, 224/42.25, 42.23; 292/216, DIG. 14, 25, DIG. 13, 28

[56] References Cited

U.S. PATENT DOCUMENTS

| 3,010,749 | 11/1961 | Brissette et al. | 292/DIG. 14 |
| 3,161,426 | 12/1964 | Peras | 292/DIG. 14 |
| 3,905,624 | 9/1975 | Fujita | 292/DIG. 14 |

FOREIGN PATENT DOCUMENTS

| 1725 | 9/1978 | European Pat. Off. | 224/42.23 |
| 3267 | 8/1979 | European Pat. Off. | 224/42.23 |
| 1551853 | 11/1968 | France | 224/42.23 |
| 2340236 | 9/1977 | France | 224/42.23 |
| 930374 | 7/1963 | United Kingdom | 292/DIG. 14 |

*Primary Examiner*—Charles A. Marmor
*Attorney, Agent, or Firm*—Oblon, Fisher, Spivak, McClelland & Maier

[57] ABSTRACT

A spare tire cradle locking arrangement in which a lock housing is mounted under the floor of an automobile trunk and the cradle is mounted to pivot into a position where it is retained and locked by a cradle retaining catch and a safety catch of the lock. A manual pull-knob located in the trunk causes simultaneous and automatic release of the safety catch and the retaining catch with the object of unlocking the cradle holding the spare tire, while reraising the cradle causes the automatic locking of the cradle by the catches.

5 Claims, 5 Drawing Figures

RETAINING AND LOCKING ARRANGEMENT FOR SPARE TIRE CRADLE

BACKGROUND OF THE INVENTION

1. Field of the Invention

The present invention relates to an arrangement for retention and locking, notably of the retention and locking of a spare tire cradle mounted so as to pivot under the floor of an automobile and, in particular, with a lock provided with an automatically operating safety system.

2. Description of the Prior Art:

Known locks are usually operated from the interior of the trunk, either by unscrewing, with the help of the crank handle, a threaded rod furnished with a nut, or by acting manually on a pull-knob.

This operation has the effect of disengaging the retaining catch in order to free the cradle.

But when, for purposes of safety, a second catch is provided, its manipulation, following that of the principal retaining catch, can be effected only from outside the vehicle and in an inconvenient manner.

Indeed, it is necessary to bend over to locate it, then to manipulate it by hand although it is dirty with spattered mud.

Other arrangements of the threaded rod-crank handle type are known which are more sophisticated but also more costly, in which the manipulation of the safety catch occurs automatically, in the continuation of that of the retaining catch.

This approach assumes that large forces can be exerted on the threaded rod and on the lock housing, requiring a sturdy lock and therefore a costly one.

Moreover, the complexity of the mechanism and the multiplicity of small parts render the lock more subject to jamming due to fouling.

SUMMARY OF THE INVENTION

The aim of the invention is to avoid the preceding drawbacks and to realize a locking arrangement of the pull-knob type which is operable from the interior of the trunk without a tool, and in which the safety catch, integrated with the main lock, is released automatically and simultaneously with the retaining catch in the process of unlocking the cradle by means of the pull-knob.

The automatic feature is likewise retained for the relocking of the cradle, where the safety and retaining catches close again in succession on the cradle after its presentation in the lock housing to put the spare tire back in place under the floor.

To this end, the invention has as its object a lock located in a housing in the form of a channel fastened under the vehicle body and made up of:

a safety catch mounted so as to pivot about a first axis across the channel, a catch pulled back by a spring in the direction for locking the cradle and tied directly to the manual pull-knob;

an adjacent lever mounted so as to pivot about the same axis and entrained by the safety catch by means of a lug passing through a slot;

and a retaining catch for the cradle mounted so as to pivot about a second axis parallel to the first, the catch being entrained by the lever and pulled against it, edge-to-edge, by a traction spring, the edges of the retaining catch and lever also exhibiting two complementary steps forming a catch so as to lock the retaining catch, by means of the lever, in the position corresponding to the locking of the cradle.

While the unlocking of the cradle is provided for by action on the pull-knob, which causes simultaneous pivoting of the safety catch, the lever and the retaining catch by the linkage described above, the relocking of the cradle occurs automatically by presentation of the latter in the lock housing where the cradle encounters suitable ramps on the safety and retaining catches for making them pivot in the sense proper for locking.

The invention permits automatic operation and thus permits reducing the number of manipulations to a minimum, in particular, by the elimination of the use of a tool such as a crank handle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
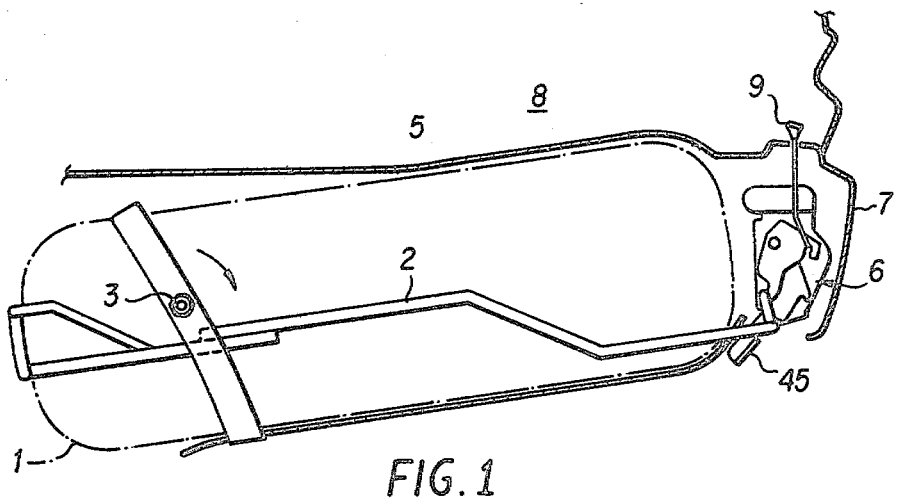
FIGS. 1 and 2 represent, in side view and from above, the spare-tire cradle engaged in the lock of the invention.
Figure 2:
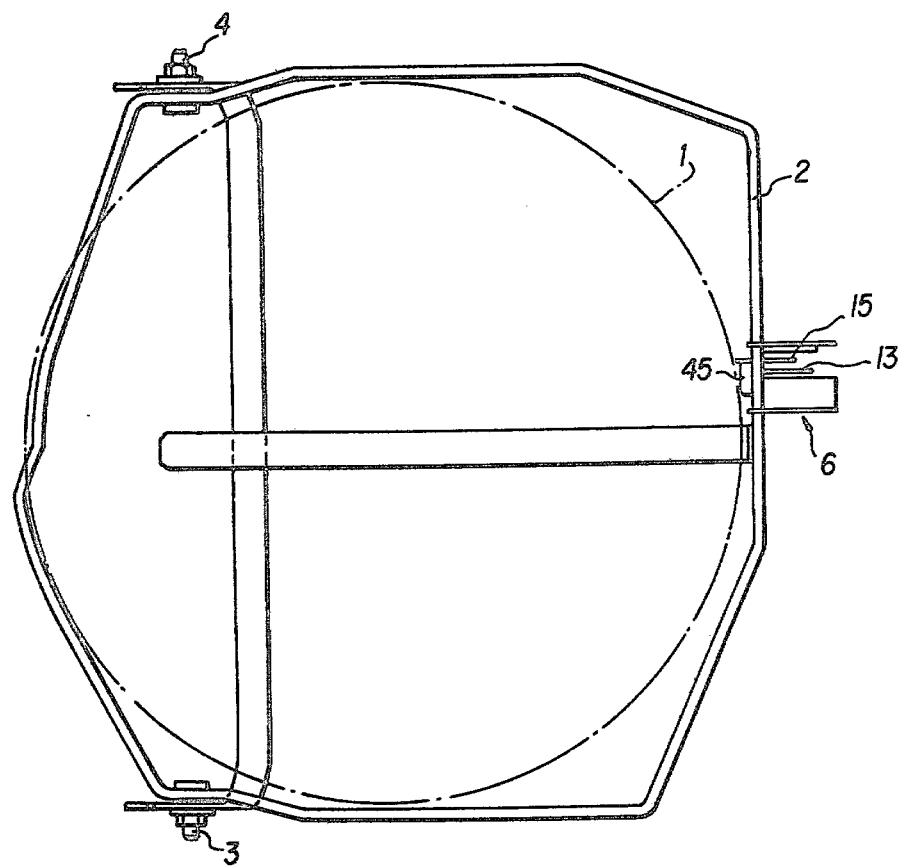

With respect to FIGS. 1 and 2, there is recognized the outline of a spare tire 1 held in place in a cradle 2 of a tubular structure, articulated at 3 and 4 under the floor 5 of a vehicle.

Figure 3:
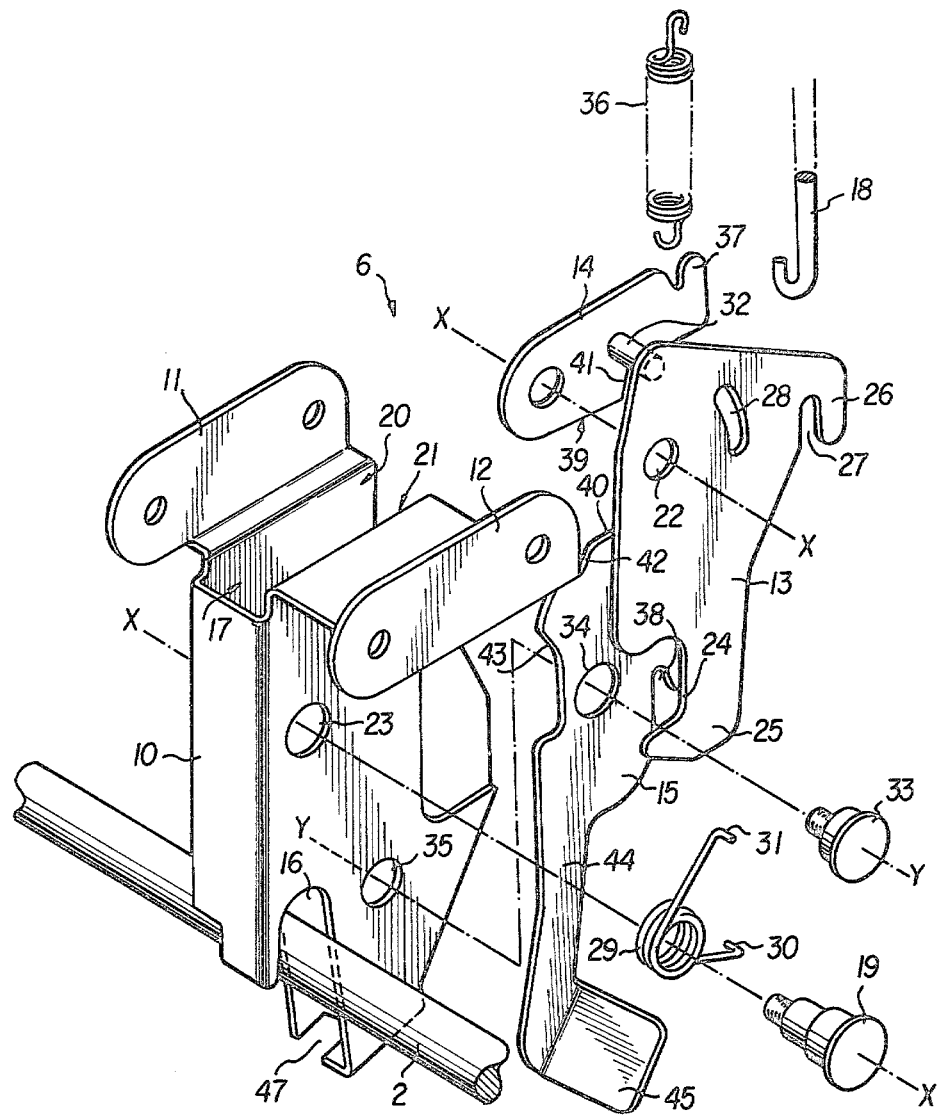
FIG. 3 is an exploded perspective view of the different parts making up the lock.

The cradle 2 is held in the lock housing 6 fastened under the body, behind the rear skirt 7 of the vehicle. The unlocking and release of the cradle are effected from inside the trunk 8 by means of the pull-knob 9 mounted on the floor 5. As is seen in FIG. 3, the lock consists, essentially, of a housing in the form of a channel 10 of folded sheet metal, fastened by two upper wings 11, 12 to the vehicle body, of a safety catch 13, of an intermediary lever 14 and of a retaining catch 15 articulated inside the channel 10 about the axes X and Y.

The channel 10 is open to permit play of the rod 18 of the pull-knob.

The safety catch 13 is mounted so as to pivot about a first axis x embodied by the pin 19 passing through the catch 13 and the sides 20, 21 of the channel through the holes 22 and 23.

This metallic pin 19 may simply be riveted on the channel.

Figure 4:
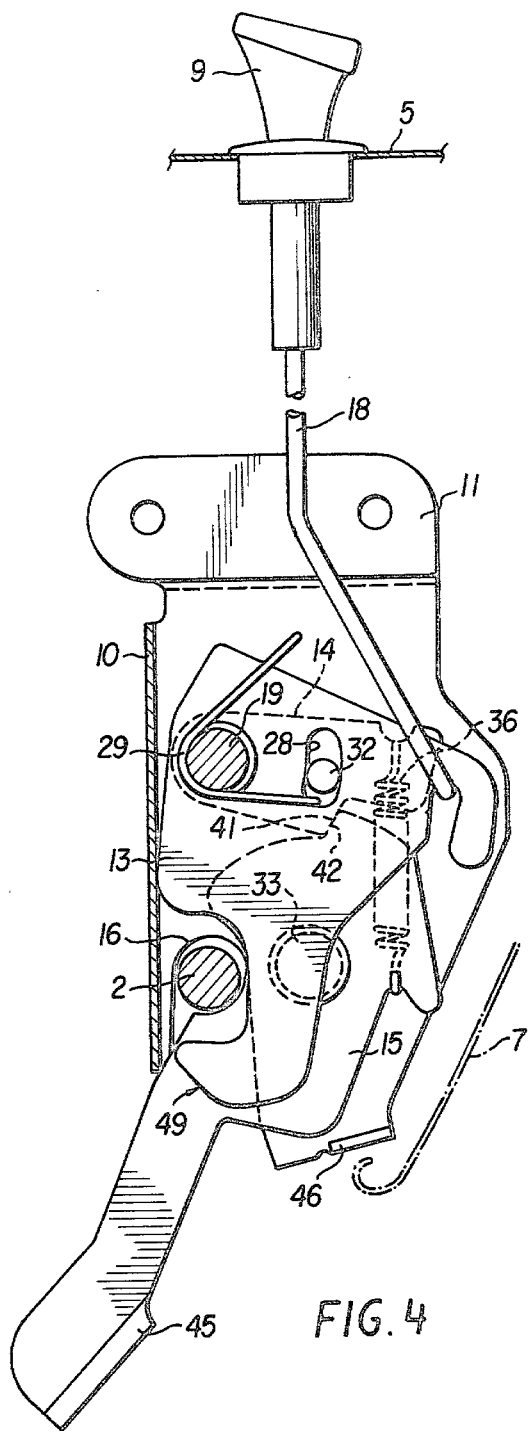
FIGS. 4 and 5 illustrate the operation of the lock represented in the locked and released positions, respectively.

The safety catch 13 is, in fact, a punched part exhibiting at its lower end a notch 24 terminating in a beak 25 and intended to confine the cradle rod 2 in the notch 16 of the housing (FIG. 4).

The upper part of the catch 13 is prolonged by a nose 26, the notch 27 of which is intended for hooking onto the rod 18 of the pull-knob.

Further, the catch 13 has an elongated orifice 28 which is curved and concentric with the axis of rotation X, the role of which will be explained below.

Finally, the catch 13 is subjected to the action of a torsional return spring 29 wound around the pin 19 and the ends 30, 31 of which engage, in "hairpin" fashion, the elongated opening 28 and a hidden orifice in the side 21 of the channel, respectively.

A lever 14 adjacent to the safety catch 13 is mounted so as to pivot about the same pin axis 19 as does the catch and possesses a lug 32 which fits through the elongated opening 28 in the catch with a play of a magnitude depending on the curved length of the opening 28.

The lever 14 pivots in the same plane as the retaining catch 15 which is mounted so as to pivot about a second axis Y embodied by the pin 33 situated lower down than the pin axis 19 and passing through the catch 15 and the sides 20, 21 of the channel via the holes 34 and 35. This pin 33 is likewise riveted onto the channel.

Lever 14 and retaining catch 15 are maintained in contact, edge-to-edge, by means of a traction spring 36 hooked in notches 37, 38 provided on tip of the lever and on the underside of the catch, respectively.

In addition, the edges 39, 40 of the lever and catch which are in sliding contact exhibit two complementary steps 41, 42 forming a catch so as to lock the retaining catch 15 by the lever 14, when the catch is in the position corresponding to the locking of the cradle 2.

To this end, the retaining catch 15 has a notch 43, near its pivot, a notch roughly coinciding with notch 24 of the safety catch, in the locking position, for confining in its turn the cradle rod 2 in the notch 16 of the housing.

Finally, the retaining catch 15 is prolonged in its lower position by a tail 44 furnished with a tab 45 in order to permit manual intervention to help in locking by pressing on the tab 45, in case of insufficient operator force on the cradle 2.

The functioning of the arrangement is as follows, with reference to FIGS. 4 and 5.

Figure 5:
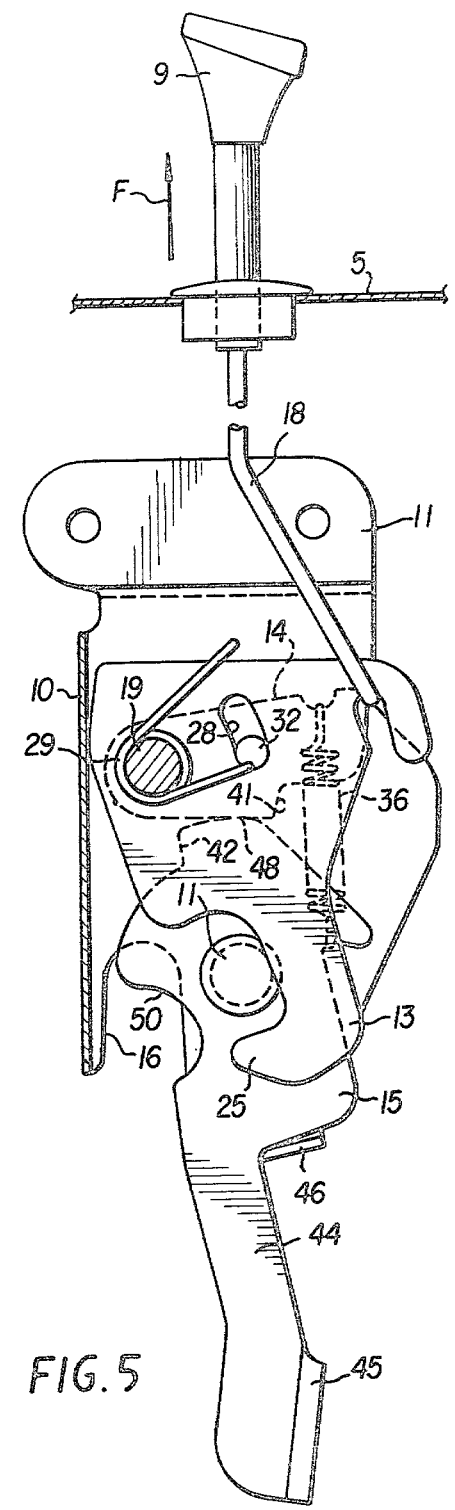

Starting in the locked position represented in FIG. 4, in which the cradle 2 is at the bottom of the notch 16 of the housing and retained by the catch 15, the operator pulls the knob 9 in the trunk 8 towards himself in the direction of arrow F to bring it to the position in FIG. 5.

In the course of the maneuver the rod 18 of the pull-knob causes the safety catch 13 to pivot in the unlocking direction, i.e. in a direction clearing the entry to the notch 16 of the housing, against the action of the return spring 29.

The pivoting safety catch 13 carries along the lever 14 by the linkage of slot 28 and lug 32, which frees the catch 41, 42 locking the retaining catch 15.

By the intermediary of the traction spring 36, the pivoting of lever 14 simultaneously causes the pivoting of the retaining catch 15 which frees the cradle rod 2.

Under its own weight, the latter pivots beneath the floor 5 and permits removal of the spare tire 1.

The travel of the retaining catch 15, however, is limited by a stop 46 on the lower part of the housing, the stop 46 being a portion of a notch 47 opening into the notch 16 for the cradle.

The retaining catch 15 can remain in this stable position thanks to its flat top 48 cooperating with the edge of lever 14, under the constraint exerted by the traction spring 36.

Upon release of the pull-knob 9, the safety catch 13 is pulled back by its return spring 29, but its travel is limited by the curved length of the opening 28 restraining the lug 32.

Nevertheless, the safety catch 13 pivots sufficiently for the lower beak 25 to place itself before the entry to the notch 16, in the path of the cradle 2.

When the cradle is raised up again, it automatically and momentarily pushes back the safety catch 13, thanks to the presence on the latter of an outer ramp 49.

If the cradle 2 is reraised with sufficient force, the cradle rod comes into contact with a ramp 50 forming the upper edge of the notch 43 in the retaining catch 15, bringing the latter from its position in FIG. 5 to the locking position in FIG. 4.

In the course of its pivoting, the retaining catch's flat top 48 slides against the corresponding edge of the lever 4 until the engagement of the catch 41, 42 under the action of the traction spring 36 is achieved, thus locking the retaining catch 15 in its position for locking the cradle 2.

If the cradle is raised with insufficient force to engage the ramp 50 of the retaining catch, it is nevertheless held up by the safety catch 13.

Manual locking is then possible by pushing directly on the tab 45 until locking of the retaining catch 15 by the lever 14 is achieved.

The invention is not limited to the example of realization described and may be applied notably to the closure of any pivoting panel, box or trunk.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A retaining and locking apparatus for a spare tire cradle which is mounted so as to pivot under the floor of an automobile, said cradle being releasable from the interior of said automobile by means of a manual pull-knob connected to said apparatus, said apparatus comprising:
   a housing adapted to be mounted below said automobile floor and adjacent said cradle, said housing defining first and second axes and a first recess adapted to hold a portion of said cradle;
   a cradle retaining catch pivotally mounted on said first axis, said cradle retaining catch including a second recess defining a first ramp portion, an elongated manual release tab extending beyond said housing and a first stepped portion, said cradle retaining catch being pivotable to a first position wherein said first and second recesses are coincident;
   first biasing means for biasing said cradle retaining catch away from said first position;
   a supplementary safety catch pivotally mounted on said second axis, said safety catch being connected to said pull-knob and including an elongated beak portion defining a third recess and a second ramp portion, said safety catch being pivotable to a first position wherein said third recess is coincident with said first and second recesses and wherein said second ramp portion is coincident with a portion of said first recess;
   second biasing means for biasing said safety catch into said first position;

lever means pivotally mounted on said second axis and including a second stepped portion engageable with said first stepped portion when said cradle retaining catch is in said first position to form a step catch; and release means associated with said lever means and said safety catch for releasing said step catch when said safety catch is moved from said first position;

whereby movement of said safety catch upon being acted on by said pull-knob, releases said step catch to release said cradle retaining catch from said first position, and wherein movement of said portion of said cradle into said first recess acts upon said first and second ramp portions to actuate said step catch and lock said cradle.

2. The apparatus of claim 1, wherein said housing is in the form of a channel, and
said first axis traverses said channel.

3. The apparatus of claim 1, wherein said release means comprise an entrainment lug on said lever means and passing through an elongated opening in said safety catch.

4. The apparatus of claim 1 wherein said housing forms a stop which limits the travel of said pivoting retaining catch from said first position.

5. The apparatus of claim 3, wherein said second biasing means is a torsion spring of "hairpin" design, wound around said second axis and the ends of which are engaged, respectively, in said elongated opening of said safety catch and in a hole through the side of said housing.

* * * * *